United States Patent Office 3,784,660
Patented Jan. 8, 1974

3,784,660
METHOD OF EXTRUDING MATERIAL FROM A PARTICULATE MASS USING A ROTATING EXTRUSION DIE
Harold Kenyon Hardy, Southport, England, assignor to United Kingdom Atomic Energy Authority, London, England
Filed Dec. 7, 1971, Ser. No. 205,549
Claims priority, application Great Britain, Dec. 18, 1970, 60,364/70
Int. Cl. B29b 3/00
U.S. Cl. 264—88   5 Claims

ABSTRACT OF THE DISCLOSURE

An extrusion process in which hydraulic pressure is exerted about a mass of particulate material to force it against a die member having a minor face carrying the extrusion orifice disposed so as to exert additional compressive stress against the particulate material to force it through the extrusion orifice.

BACKGROUND OF THE INVENTION

This invention relates to the forming of materials.

In the hydrostatic extrusion process liquid is pressurized about a workpiece in a container to effect extrusion of the workpiece from the container through a die. As in conventional extrusion the workpiece is generally of solid material, for example a metal billet.

SUMMARY OF THE INVENTION

According to the present invention a hydrostatic extrusion process is carried out using a workpiece in the form of an agglomerated mass of particulate material.

The workpiece may be clad on its surface with a temporary liquid-tight barrier of non-metallic yielding material which prevents infiltration of pressurized liquid into the pores of the workpiece during the hydrostatic extrusion process. However extrusion of an unclad workpiece can be carried out if the particulate material of the workpiece is sufficiently precompacted.

The liquid tight barrier of non-metallic yielding material where provided on the surface of the workpiece may be of a plastic material such as polytetrafluoroethylene, polyvinyl chloride or latex.

Copending U.S. application Ser. No. 880,127, filed Nov. 26, 1969, discloses an extrusion process in which a workpiece is subjected to an overall compressive stress in a container to force the end of the workpiece into an initial reducing die at one end of the container. The overall compressive stress is applied, for example, on the workpiece by pressurization of hydraulic liquid in the container about the workpiece. A tool having a material working face is applied to the end of the workpiece in the reducing die and the tool is moved so that the material of the workpiece in the reducing die forward of the material working face of the tool is subjected to an additional compressive stress and is formed through an orifice associated with the tool and defining the product cross section.

According to a further feature of the present invention a hydrostatic extrusion process as disclosed in copending U.S. application Ser. No. 880,127 is carried out using a workpiece in the form of an agglomerated mass of particulate material. In this case also the workpiece may be of unclad form or may be provided on its surface with a liquid tight barrier of non-metallic yielding material such as a plastic material.

DESCRIPTION OF THE DRAWING

An embodiment of the invention will now be described by way of example with reference to the accompanying drawing in which.

DESCRIPTION OF THE PREFERRED EMBODIMENT

Figure 1:
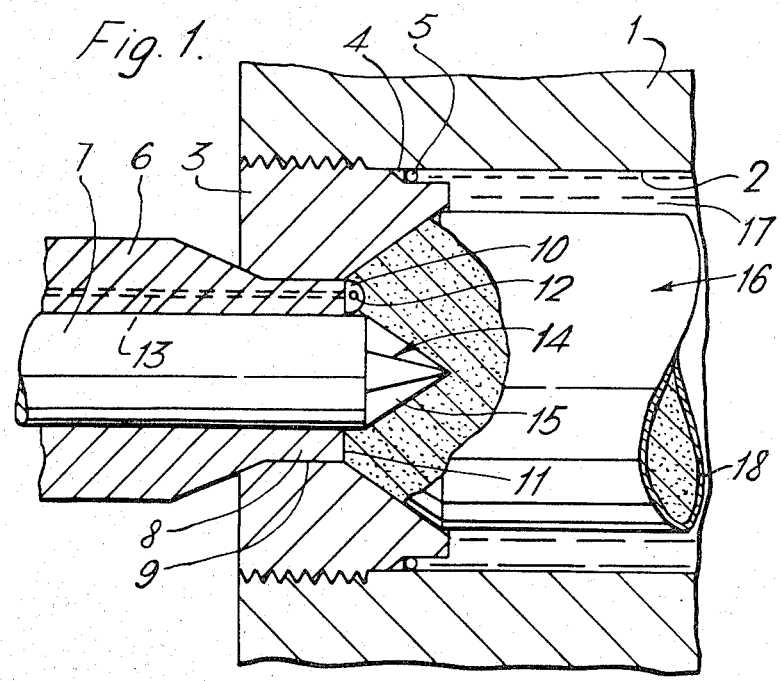
FIG. 1 is a longitudinal sectional elevation.
Figure 2:
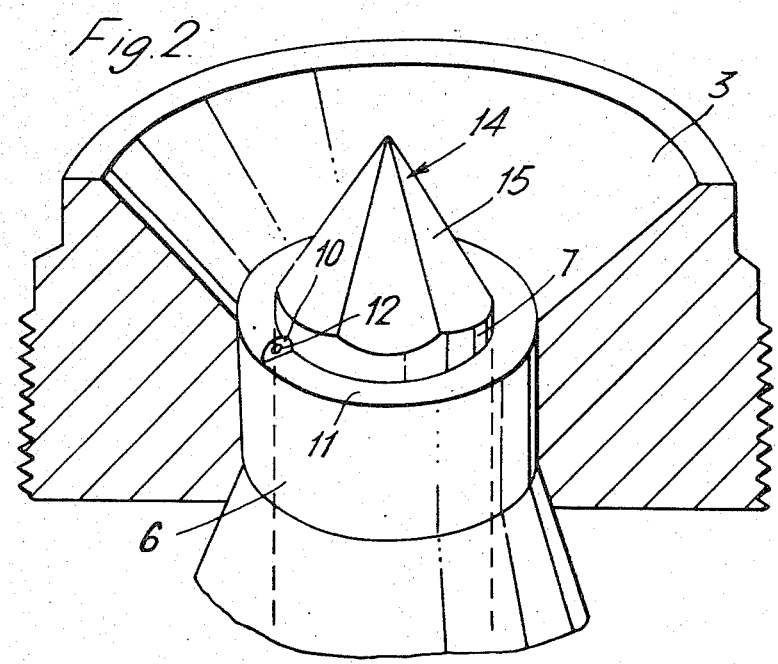
FIG. 2 is a detail of FIG. 1 in isometric form.

In the drawings there is shown a chamber 1 having a bore 2. A reducing die 3 is screw fitted in the end of the bore 2.

The die 3 is sealed in the bore 2 by a copper mitre ring 4 and a rubber O ring 5. A sleeve shaped rotary die block 6 is fitted on a stationary stem 7. The end 8 of the sleeve shaped die block 6 is reduced to fit in the parallel outlet 9 of the reducing die 3. A die member 10 is formed projecting from the annular major end face 11 of the die block 6. A die orifice 12 in a minor face of the die member 10 transverse of the major end face connects with a passageway 13 leading through the sleeve shaped die block 6. The stationary stem 7 has a pointed end 14 with flats 15. The stationary stem 7 is fixedly supported on a main base frame and the sleeve shaped die block 6 is rotatably supported on the stationary stem 7 by a heavy duty bearing (not shown).

In use of the arrangement described above a billet 16 is subjected to the pressure of hydraulic liquid 17 surrounding the billet 16 in the bore 2 of chamber 1. The pressure of the liquid 17 subjects the billet to an overall compressive stress system and also loads the billet 6 longitudinally into the reducing die 3. The nose of the billet 16 is forced into the reducing die 3 over the pointed end 14 of the stationary stem 17. The sleeve shaped die block 6 is driven on the stationary stem 7 thus driving the die member 10 through the billet material at the mouth of the reducing die 3. The material of the billet forward of the face of the die member 10 is subjected to an additional localized compressive stress system arising from the mechanical loading applied on the billet material in the reducing die 3 by the minor face of the die member 10. The material of the billet traversed by the die member 10 is extruded through the die orifice 12. Extrusion of the billet material is under the additive effect of the overall compressive stress applied in the billet by the pressure of the hydraulic liquid and the localized additional compressive stress which is set up in the billet material at the mouth of the reducing die 3 forward of the face of the die member 10.

The wire product extruded through the orifice 12 passes through the passageway 13 in the die block 6 and is coiled on a spool concentric with the stationary stem 7. Under the pressure of the hydraulic liquid 17 the billet 16 is continually fed into the reducing die 3 to replace the billet material which is extruded through the orifice 12 in the die member 10. The pointed end 14 of the stationary stem 7 acts as a guide for feeding of billet material into the region of the annular end face 11 of the sleeve shaped die block 14.

In accordance with the invention the billet 16 is in the form of an agglomerated mass of particulate material. The billet 16 consisting of a powder of one or several materials is shaped by filling a flexible container with the powder and then by subjecting the container and the powder to hydrostatic pressure in a pressure chamber. After compacting the casing is removed and one end of the billet 16 is shaped to fit the reducing die 3. The billet 16 is then inserted into the chamber 1 and the liquid 17 surrounding the billet 16 in the chamber 1 is raised to the required pressure for extrusion to be carried out. Extrusion of the billet 16 procedes with rotation of the die block 6. The overall compression applied on the billet 16 feeds the billet 16 into the reducing die 3 wherein a high compaction of the particulate material of the billet occurs. The particulate material of the billet 16 compacted in the reducing die 3 is then operated on by one die block 6 resulting in the formation of a solid extruded product. If the billet 16 is sufficiently precompacted it may be extruded in an unclad condition. However it is usually preferable to provide a leak tight layer 18 of plastic material on the outer surface of the billet which prevents infiltration of the pressurized liquid 17 into the pores of the billet 16. Suitable plastics are for example polytetrafluorethylene, polyvinyl chloride or latex. Plastics such as polytetrafluorethylene or polyvinyl chloride can be applied to form the layer 18 on the surface of the billet 16 by bringing the heated billet into contact with a powder or grains of the plastic followed by furnace treatment of the billet to spread the plastic and form a continuous layer. It is also possible to apply the plastic by dipping the billet in a melt or solution of the plastic or by spraying molten plastic or plastic dissolved in a solvent onto the billet. The latter method using material dissolved in a solvent is particularly applicable to the forming of a layer of a material such as latex on the billet.

I claim:

1. A process of extruding comprising:
   (a) positioning a compacted mass of particulate material in a chamber;
   (b) closing one end of said chamber at least partially with a rotatable annular die member having an extrusion orifice therethrough, said die member having a major end face disposed in a plane transverse to the central axis of said die and in contact with said mass and a minor face disposed transversely of said major end face and said minor face having said orifice therein; and
   (c) applying a hydraulic liquid to said chamber and about the workpiece to force the compacted mass against the annular die member,
   (d) rotating said die and subjecting said mass to additional localized compressive stress applied by said minor face to extrude said material through said orifice.

2. An extrusion process as claimed in claim 1 wherein the workpiece is precompacted to a degree so as to prevent infiltration of the hydraulic liquid into the pores of the workpiece during the extrusion process.

3. An extrusion process as claimed in claim 1 wherein the workpiece is clad on its surface with a temporary liquid tight barrier of non-metallic yielding material.

4. An extrusion process as claimed in claim 3 wherein the temporary liquid tight barrier of non-metallic yielding material is of a plastic material.

5. An extrusion process as claimed in claim 4 wherein the plastic material is a material selected from the group consisting of polytetrafluorethylene and polyvinyl chloride.

References Cited
UNITED STATES PATENTS

| | | | |
|---|---|---|---|
| 3,262,155 | 7/1966 | Alexander | 264—Dig. 50 |
| 3,507,941 | 4/1970 | Kies et al. | 264—323 X |
| 2,945,265 | 7/1960 | Sell et al. | 264—176 R |
| 3,501,560 | 3/1970 | Howes et al. | 264—176 F |

ROBERT F. WHITE, Primary Examiner

W. E. HOAG, Assistant Examiner

U.S. Cl. X.R.

264—109, 176 F, 310